United States Patent
Sakamoto et al.

(10) Patent No.: US 8,203,751 B2
(45) Date of Patent: Jun. 19, 2012

(54) COLOR SIGNAL CONVERTING APPARATUS, IMAGE FORMING APPARATUS, COLOR SIGNAL CONVERSION METHOD AND COMPUTER READABLE MEDIUM

(75) Inventors: Masaomi Sakamoto, Ebina (JP); Yoshiharu Hibi, Ebina (JP); Toshiyuki Yano, Ebina (JP); Ryouichi Satoh, Ebina (JP); Toshifumi Takahira, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 490 days.

(21) Appl. No.: 12/057,111

(22) Filed: Mar. 27, 2008

(65) Prior Publication Data
US 2009/0080005 A1   Mar. 26, 2009

(30) Foreign Application Priority Data
Sep. 20, 2007  (JP) ................. 2007-243397

(51) Int. Cl.
*H04N 1/60* (2006.01)
*G06K 15/00* (2006.01)
(52) U.S. Cl. ......................... 358/1.9; 358/2.1
(58) Field of Classification Search ............... None
See application file for complete search history.

(56) References Cited

U.S. PATENT DOCUMENTS

| | | | |
|---|---|---|---|
| 7,643,173 B2 | 1/2010 | Komatsu | |
| 2005/0062992 A1 | 3/2005 | Kishimoto et al. | |
| 2005/0275858 A1* | 12/2005 | Fan et al. | 358/1.9 |
| 2006/0056683 A1 | 3/2006 | Komatsu | |
| 2006/0262332 A1* | 11/2006 | Higashikata | 358/1.9 |
| 2008/0007784 A1* | 1/2008 | Tsuji | 358/2.1 |

FOREIGN PATENT DOCUMENTS

| | | |
|---|---|---|
| JP | 2002-281332 A | 9/2002 |
| JP | 2002-305662 A | 10/2002 |
| JP | 2003-008912 A | 1/2003 |
| JP | 2005-35012 A | 2/2005 |
| JP | 2005-063093 A | 3/2005 |
| JP | 2006-068982 A | 3/2006 |
| JP | 2007-043250 A | 2/2007 |

OTHER PUBLICATIONS

Japanese Office Action dated Dec. 15, 2009 for JP Application No. 2007-243397.

* cited by examiner

*Primary Examiner* — Twyler Haskins
*Assistant Examiner* — Barbara Reinier
(74) *Attorney, Agent, or Firm* — Sughrue Mion, PLLC

(57) ABSTRACT

The color signal converting apparatus is provided with: a color signal receiving unit that receives input of first color signals; and a converting unit that performs a conversion of the first color signals received by the color signal receiving unit, into second color signals. The converting unit performs the conversion to make a total sum of color component values of each of the second color signals equal to or smaller than an upper limit value set for each of the second color signals.

6 Claims, 14 Drawing Sheets

| No. | COLOR COORDINATE VALUES AT GRID POINT $(C_j, M_j, Y_j, K_j)$ | $K_j$ VALUE | $H_j'$ VALUE $(=C_j+M_j+Y_j)$ | TOTAL LIMIT VALUE $T_j$ | [Cf.] : $H_j$ VALUE $(=C_j+M_j+Y_j+K_j)$ |
|---|---|---|---|---|---|
| 1 | 0,0,0,0 | 0 | 0 | 50 | 0 |
| 2 | 30,20,0,0 | 0 | 50 | 100 | 50 |
| 3 | 0,0,0,50 | 50 | 0 | 80 | 50 |
| ... | ..... | ..... | ..... | ..... | ..... |
| 4 | 20,30,50,10 | 10 | 100 | 160 | 110 |
| 5 | 0,0,10,100 | 100 | 10 | 140 | 110 |
| ... | ..... | ..... | ..... | ..... | ..... |
| ... | ..... | ..... | ..... | ..... | ..... |

FIG.4

| No. | COLOR COORDINATE VALUES AT GRID POINT $(C_j, M_j, Y_j, K_j)$ | $K_j$ VALUE | $H_j'$ VALUE $(=C_j+M_j+Y_j)$ | TOTAL LIMIT VALUE $T_j$ | [Cf.]: $H_j$ VALUE $(=C_j+M_j+Y_j+K_j)$ |
|---|---|---|---|---|---|
| 1 | 0,0,0,0 | 0 | 0 | 50 | 0 |
| 2 | 30,20,0,0 | 0 | 50 | 100 | 50 |
| 3 | 0,0,0,50 | 50 | 0 | 80 | 50 |
| ⋮ | ⋮ | ⋮ | ⋮ | ⋮ | ⋮ |
| 4 | 20,30,50,10 | 10 | 100 | 160 | 110 |
| 5 | 0,0,10,100 | 100 | 10 | 140 | 110 |
| ⋮ | ⋮ | ⋮ | ⋮ | ⋮ | ⋮ |
| ⋮ | ⋮ | ⋮ | ⋮ | ⋮ | ⋮ |

COLOR SIGNAL CONVERTING APPARATUS, IMAGE FORMING APPARATUS, COLOR SIGNAL CONVERSION METHOD AND COMPUTER READABLE MEDIUM

CROSS REFERENCE TO RELATED APPLICATIONS

This application is based on and claims priority under 35 USC §119 from Japanese Patent Application No. 2007-243397 filed Sep. 20, 2007.

BACKGROUND

1. Technical Field

The present invention relates to a color signal converting apparatus, an image forming apparatus, a color signal conversion method and a computer readable medium storing a program.

2. Related Art

An image forming apparatus such as a printer or a digital copy machine usually has a color reproduction range (color gamut) different from that of an input image. For this reason, in general, the image forming apparatus performs processing of converting color signals constituting an input image, into the color signals (output color signals) within the color gamut supported by the image forming apparatus. In this case, as a result of the conversion of the color signals of the input image into the output color signals, the total sums of color component values of the output color signals (color component total value) may be larger than that of the color signals of the input image. An increase of the color component total value results in an increase of a total amount (color material total amount) of color materials such as toner required to form an image according to the output signals.

SUMMARY

According to an aspect of the invention, there is provided a color signal converting apparatus including: a color signal receiving unit that receives input of first color signals; and a converting unit that performs a conversion of the first color signals received by the color signal receiving unit, into second color signals. The converting unit performs the conversion to make a total sum of color component values of each of the second color signals equal to or smaller than an upper limit value set for each of the second color signals.

BRIEF DESCRIPTION OF THE DRAWINGS

Exemplary embodiment(s) of the present invention will be described in detail based on the following figures, wherein:

FIG. 4 is a diagram showing a part of a table configured to have a set of $(K_j, H_j', T_j)$, as one example;

DETAILED DESCRIPTION

Hereinafter, exemplary embodiments of the present invention will be described in detail by referring to the accompanying drawings.

[First Exemplary Embodiment]

Figure 1:
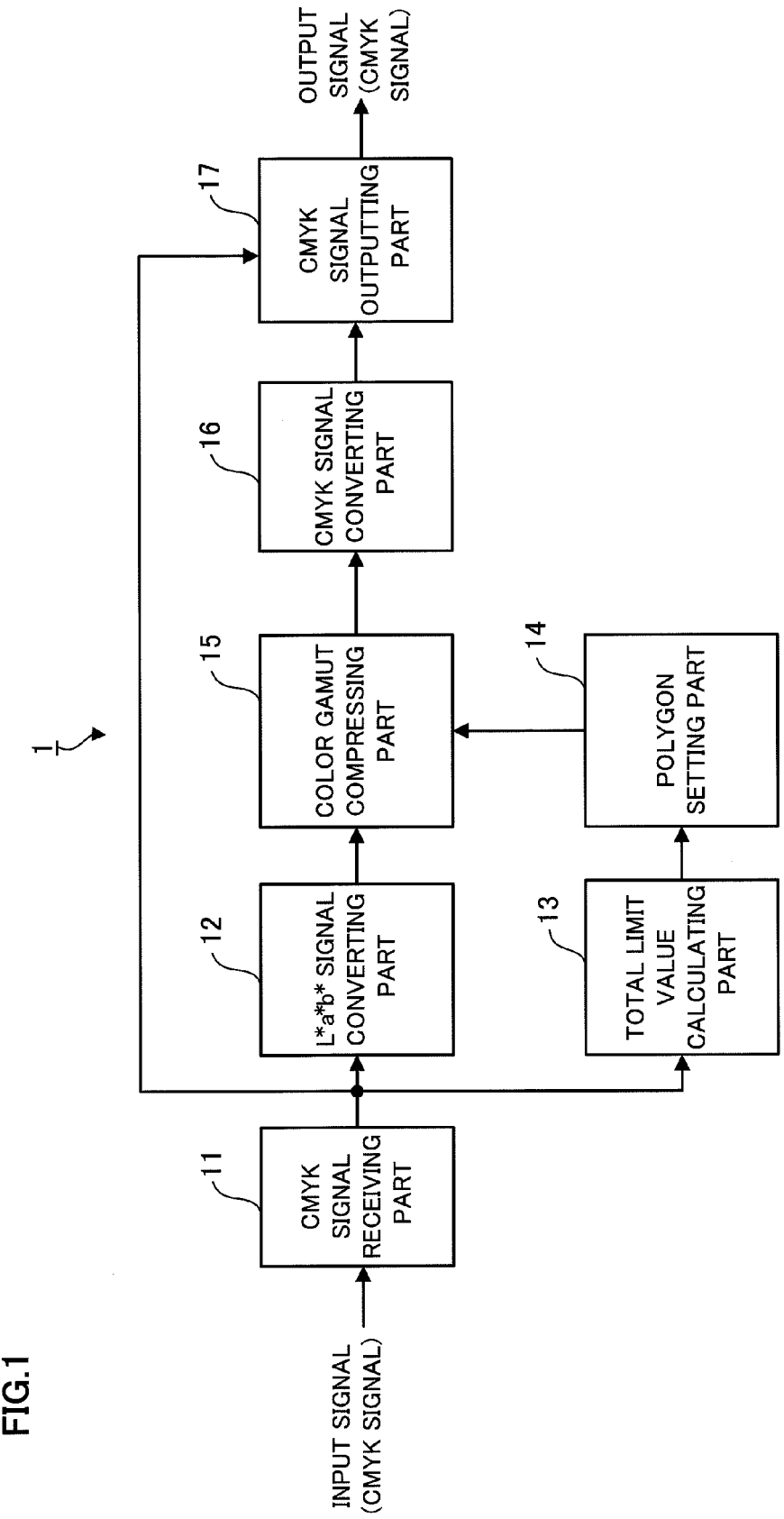
FIG. 1 is a block diagram for explaining a functional configuration of a color signal converting apparatus to which the first exemplary embodiment is applied.

FIG. 1 is a block diagram for explaining a functional configuration of a color signal converting apparatus to which the first exemplary embodiment is applied. The color signal converting apparatus 1 shown in FIG. 1 includes a CMYK signal receiving part 11, a L*a*b* signal converting part 12, a total limit value calculating part 13, a polygon setting part 14, a color gamut compressing part 15, a CMYK signal converting part 16 and a CMYK signal outputting part 17. The color signal converting apparatus 1 of the first exemplary embodiment executes color signal converting processing on color signals received by the CMYK signal receiving part 11. The L*a*b* signal converting part 12, the total limit value calculating part 13, the polygon setting part 14, the color gamut compressing part 15 and the CMYK signal converting part 16 constitute a converting unit.

Figure 2:
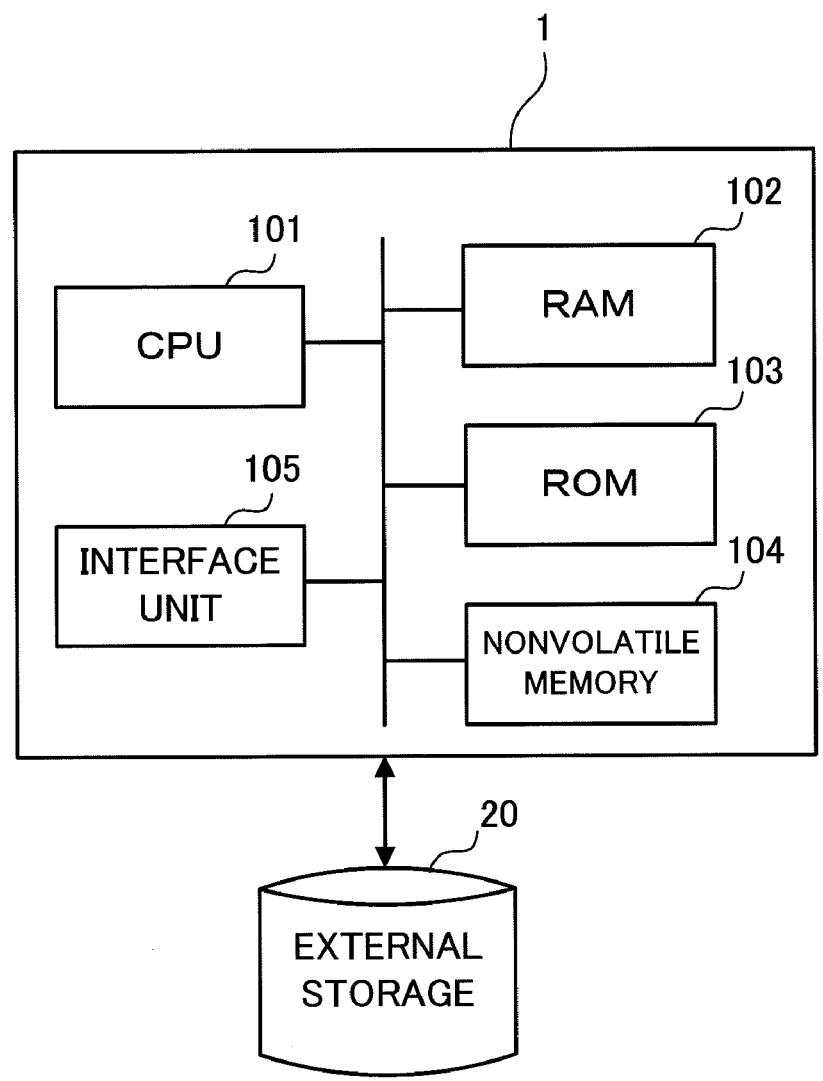
FIG. 2 is a block diagram showing an internal configuration of the color signal converting apparatus of the first exemplary embodiment.

FIG. 2 is a block diagram showing an internal configuration of the color signal converting apparatus 1 of the first exemplary embodiment.

As shown in FIG. 2, the color signal converting apparatus 1 includes a CPU 101, a RAM 102, a ROM 103, a nonvolatile memory 104 and an interface unit 105. The CPU 101 is one example of a computing device that executes digital computing processing in accordance with a predetermined processing program when the color signal converting apparatus 1 executes the color signal converting processing. The RAM 102 is used as a working memory for the CPU 101. The ROM 103 is one example of a memory that stores the processing program and the like to be executed by the CPU 101. The nonvolatile memory 104 is one example of a memory such as a SRAM backed up by a battery, a flash memory or the like, which is rewritable and capable of holding data even without power supply. The interface unit 105 controls input and output of signals to and from each component connected to the color signal converting apparatus 1.

In addition, an external storage 20 stores a processing program to be executed by the color signal converting apparatus 1. The color signal converting apparatus 1 of the first exemplary embodiment executes color signal converting processing by reading this processing program from the external storage 20.

More specifically, the program implementing each of the functions of the aforementioned CMYK signal receiving part 11, L*a*b* signal converting part 12, total limit value calculating part 13, polygon setting part 14, color gamut compressing part 15, CMYK signal converting part 16 and CMYK signal outputting part 17 is read from the external storage 20 into the ROM 103 inside the color signal converting apparatus 1. Then, the CPU 101 executes various kinds of processing in accordance with the program read into the ROM 103. This program is provided, for example, by loading to the ROM 103, the program stored in a reserved area in a hard disk, a DVD-ROM, or the like serving as the external storage 20. Instead of this providing way, the program is stored in the ROM 103 in advance and thus provided. Alternatively, if the color signal converting apparatus 1 is provided with the rewritable ROM 103 such as an EEPROM, the color signal converting apparatus 1 is firstly assembled and then only the program is provided and installed into the ROM 103. Otherwise, the program is transmitted to the color signal converting apparatus 1 via a network such as the Internet, and installed to the ROM 103 in the color signal converting apparatus 1.

The CMYK signal receiving part 11 is one example of a color signal receiving unit and an image signal receiving unit. The CMYK signal receiving part 11 receives, as color signals (first color signals) to be processed, color coordinate values of grid points regularly arranged, for example, in a CMYK color space (first color space) that is a device-dependent color space.

In general, in the four-dimensional CMYK color space, the color coordinate values (C, M, Y, K) are each set within a range of C, M, Y, K=0 to 100 inclusive. Here, a set of color coordinate points (0, 0, 0, 0) to (100, 0, 0, 0) on a C axis, a set of color coordinate points (0, 0, 0, 0) to (0, 100, 0, 0) on a M axis, a set of color coordinate points (0, 0, 0, 0) to (0, 0, 100, 0) on a Y axis and a set of color coordinate points (0, 0, 0, 0) to (0, 0, 0, 100) on a K axis are each sectioned per certain number of steps (for example, 10 steps). Then, all combinations of sectioned color coordinate points are generated and defined as grid points in the CMYK color space. For example, (0, 0, 0, 0), (0, 10, 0, 0), (0, 0, 10, 0), (0, 0, 0, 10), etc. are grid points.

The L*a*b* signal converting part 12 is one example of a first color space converting part. In accordance with predetermined color converting characteristics, the L*a*b* signal converting part 12 converts the color coordinate values (C, M, Y, K) of each grid point acquired by the CMYK signal receiving part 11, into, for example, the color coordinate values (L*, a*, b*) in a L*a*b* color space (second color space) that is a device-independent color space.

The color converting characteristics used by the L*a*b* signal converting part 12 are estimated as color converting characteristics uniquely owned by an apparatus (target device) generating color signals that is to be received by the CMYK signal receiving part 11. More specifically, for example, in the case where the target device is a printer, the printer prints a color patch (color sample) including various combinations of color signals (C, M, Y, K) in the CMYK color space. Then, the color of the color patch is measured (color-measured) in, for example, the L*a*b* color space. Thereafter, actual data pairs are generated. Specifically, each actual data pair is composed of the actual data of an input signal (C, M, Y, K), and that of the color coordinates (L*, a*, b*) of the color patch of an output image in the L*a*b* color space. Thereafter, the color converting characteristics are estimated by performing, for example, statistical processing such as the linear regression analysis using the generated actual data of the input signals (C, M, Y, K), and that of the color coordinates (L*, a*, b*) of the output images. Other applicable methods for estimating the color converting characteristics from the actual data pair include a method in which the color converting characteristics are estimated through interpolating processing by simply calculating the weight averages of the actual data pairs, a method in which the color converting characteristics are estimated through statistic processing using a neural network that has learned the actual data pairs, or the like.

The total limit value calculating part 13 is one example of a total sum upper limit setting part. The total limit value calculating part 13 figures out a total amount H of color component values (color component total value) for the respective color coordinate values (C, M, Y, K) at a grid point acquired by the CMYK signal receiving part 11. In summary, the total limit value calculating part 13 calculates a color component total value $H_j$ at each grid point $(C_j, M_j, Y_j, K_j)$ by using the following equation (1).

$$H_j = C_j + M_j + Y_j + K_j \tag{1}$$

Then, the total limit value calculating part 13 figures out a total limit value $T_j$ based on a table defining a correspondence between the color component total value $H_j$ and the total limit value $T_j$ at each grid point. Note that, if each of $C_j, M_j, Y_j, K_j$ takes a value within a range of 0 to 100 inclusive, the color component total value $H_j$ takes a value within a range of 0 to 400 inclusive, and accordingly the total limit value $T_j$ is also defined as a value within a range of 0 to 400 inclusive. In addition, the table mentioned here is stored in, for example, the nonvolatile memory 104 which is one example of a memory.

This total limit value $T_j$ is one example of an upper limit value. Specifically, the total limit value $T_j$ regulates an upper limit value for the total sum of color component values for an output color signal $(C_j', M_j', Y_j', K_j')$. Here, the output color signal $(C_j', M_j', Y_j', K_j')$ is outputted from the CMYK signal outputting part 17, after the color signal converting apparatus 1 receives the color coordinate values $(C_j, M_j, Y_j, K_j)$ at the grid point through the CMYK signal receiving part 11, and performs color conversion processings on the color coordinate values $(C_j, M_j, Y_j, K_j)$.

In essence, the color signal converting apparatus 1 of the first exemplary embodiment sets the total limit value $T_j$ for each grid point (pixel), and outputs, from the CMYK signal outputting part 17, the output color signal $(C_j', M_j', Y_j', K_j')$ that is set to satisfy the following equation (2).

$$T_j \geq (C_j' + M_j' Y_j' + K_j') \tag{2}$$

Figure 3:
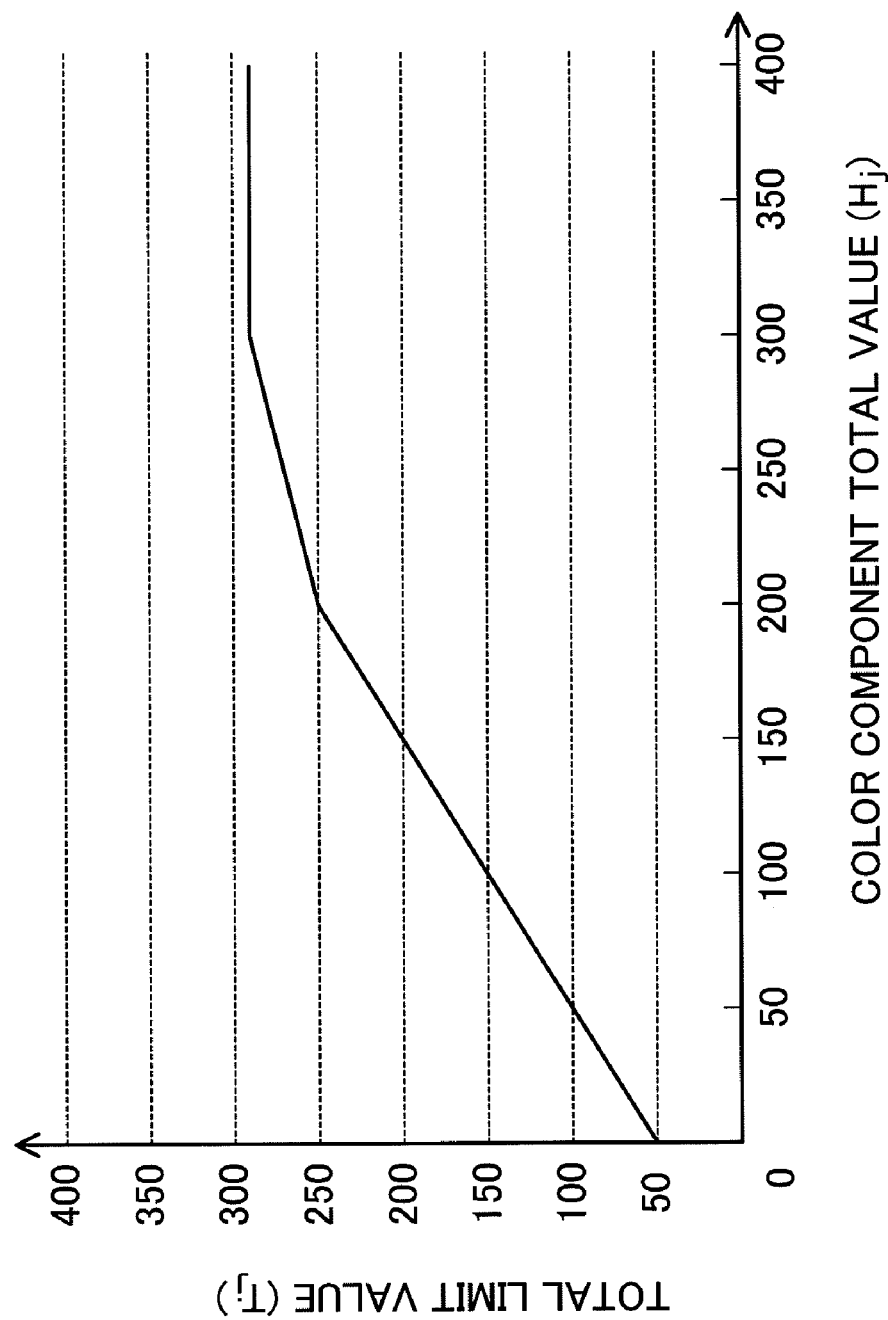
FIG. 3 is a graph showing one example of a relationship between the color component total value and the total limit value.

FIG. 3 is a graph showing one example of a relationship between the color component total value $H_j$ and the total limit value $T_j$. In the example shown in FIG. 3, for example, the total limit value $T_j$ is set to 100 for the grid point having a color component total value $H_j$ of 50, while the total limit value $T_j$ is set to 250 for the grid point having a color component total value $H_j$ of 200. Moreover, the upper limit of the total limit value $T_j$ is set to 280, as a whole. Such relationship between the color component total value $H_j$ and the total limit value $T_j$ is stored, for example, as a table (one-dimensional table). On the basis of this table, calculated is the total limit value $T_j$ corresponding to the color component total value $H_j$ at each grid point calculated by using the equation (1).

The total limit value $T_j$ in FIG. 3 is figured out based on the color component total value $H_j$ calculated as the total sum of all the color component values of each grid point $(C_j, M_j, Y_j, K_j)$ as shown in the equation (1). Instead of the aforementioned calculation method, a relationship may be determined among the total limit value $T_j$, a set of a black (K) value $K_j$, and a total sum $H_j'(=C_j'+M_j'+Y_j')$ of a cyan value $C_j$, a magenta value $M_j$ and a yellow value $Y_j$ excluding the black (K) value. In other words, a set of $(K_j, H_j', T_j)$ may be stored as a table (two-dimensional table). Then, $H_j'$ maybe calculated from the color coordinate values $(C_j, M_j, Y_j, K_j)$ at each grid point, and the total limit value $T_j$ for each grid point may be found based on the table in which a set of $(K_j, H_j', T_j)$ is stored.

FIG. 4 is a diagram showing a part of a table configured to have a set of $(K_j, H_j', T_j)$, as one example. In the table shown in FIG. 4, the black (K) value $K_j$ and the total sum $H_j'$ of CMY are treated independently. In this way, the total limit value $T_j$ is set more minutely for the color coordinate values $(C_j, M_j, Y_j, K_j)$ at the grid points received by the CMYK signal receiving part 11.

For instance, as shown in FIG. 4, the grid points of No. 2 and No. 3 have different $K_j$ values from each other, even while having the same color component total value $H_j(=50)$ that is the total sum of the color components indicated as [Cf.]. Specifically, $K_j=0$ at the grid point of No. 2, while $K_j=50$ at the grid point of No. 3. Moreover, although the color component total value $H_j$ takes the same value (=110) at the grid points of No. 4 and No. 5, the $K_j$ value takes different values, that is, $K_j=10$ at the grid point of No. 4, while $K_j=100$ at the grid point of No. 5. In this case, if a certain grid point has even the same color component total value $H_j$ as another different grid point, but also has a larger $K_j$ value than the different grid point, only the certain grid point is processed through particular color signal converting processing, in some cases. In this particular color signal converting processing, the total sum $H_j'(=C_j+M_j+Y_j)$ of CMY is increased for the purpose of supplementing "darkness" in hue that the black (K) color is not capable of representing alone.

For this reason, in the table shown in FIG. 4, the black (K) value $K_j$ and the total sum $H_j'$ of CMY are treated independently. This allows the total limit value $T_j$ to be set to be relatively small for a certain grid point when the certain grid point has a large $K_j$ value, for example, even having the same color component total value $H_j$ as another different grid point.

The polygon setting part 14 is one example of a color region setting unit. From the total limit value calculating part 13, the polygon setting part 14 acquires the total limit value $T_j$ calculated for the color coordinate values $(C_j, M_j, Y_j, K_j)$ at each grid point received by the CMYK signal receiving part 11. Then, the polygon setting part 14 sets a polygon according to the total limit value $T_j$ acquired from the total limit value calculating part 13. This polygon is one example of a color region used in the color gamut compression processing executed by the color gamut compressing part 15. Thereafter, the set polygon is transmitted to the color gamut compressing part 15.

Figure 5:
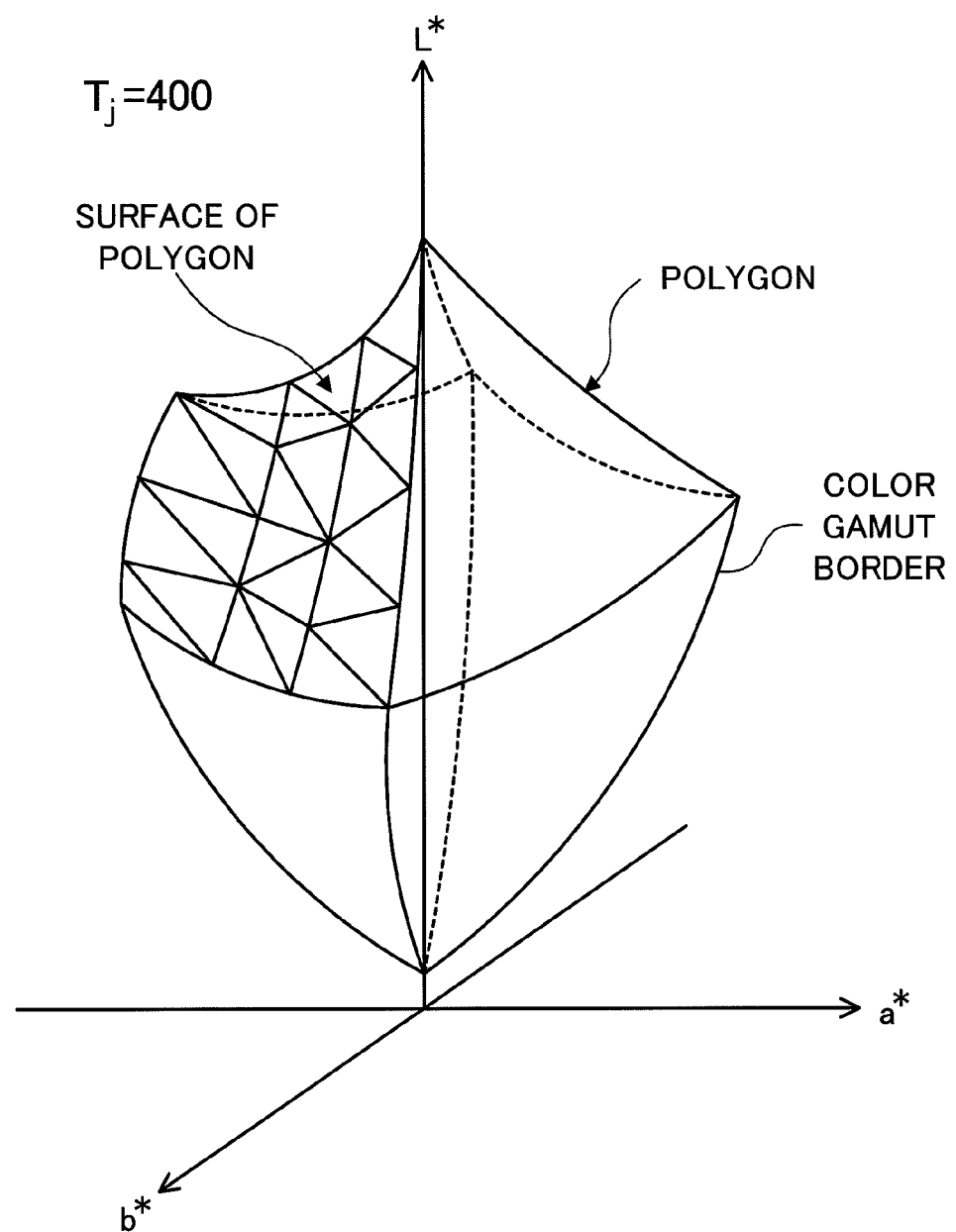
FIGS. 5 to 8 are diagrams showing examples of polygons set by the polygon setting part.

FIGS. 5 to 8 are diagrams showing examples of polygons set by the polygon setting part 14. FIG. 5 shows a polygon in the case where $T_j=400$ is set. Since $T_j=400$ is the maximum value of the total limit value $T_j$, the polygon in FIG. 5 exactly shows the color reproduction range (color gamut) of an image forming apparatus for example, which outputs an image based on a color signal conversion profile (refer to the following description) generated by the color signal converting apparatus 1. Note that the polygon has, as a color gamut border, boundary surfaces configured by a group of polygons (polygon planes) such as triangles, and indicates that the image forming apparatus reproduces colors in the color space region inside the color gamut border. Moreover, FIGS. 5 to 8 each show only a part of the polygon planes on the color gamut border.

Figure 6:
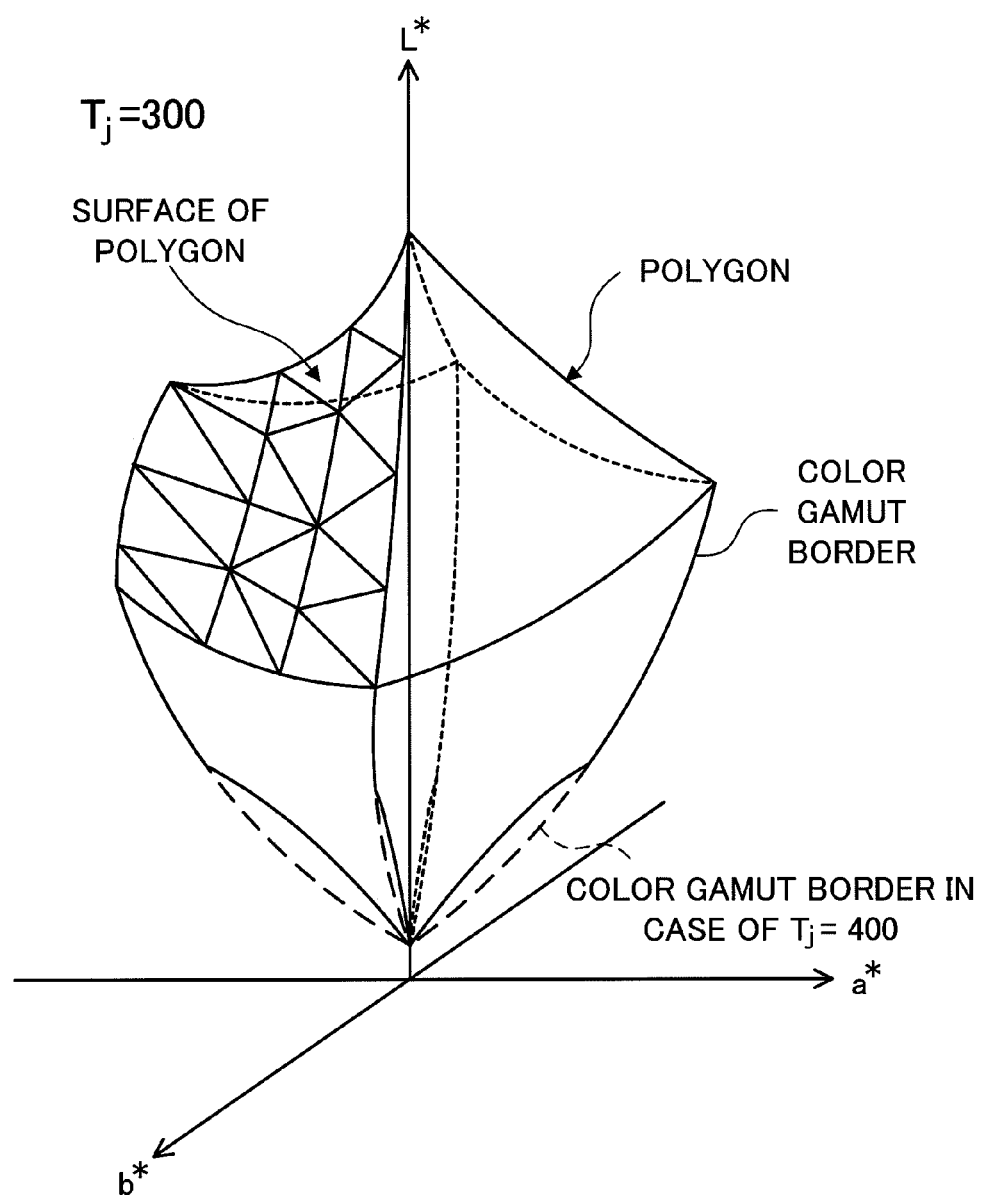
Figure 7:
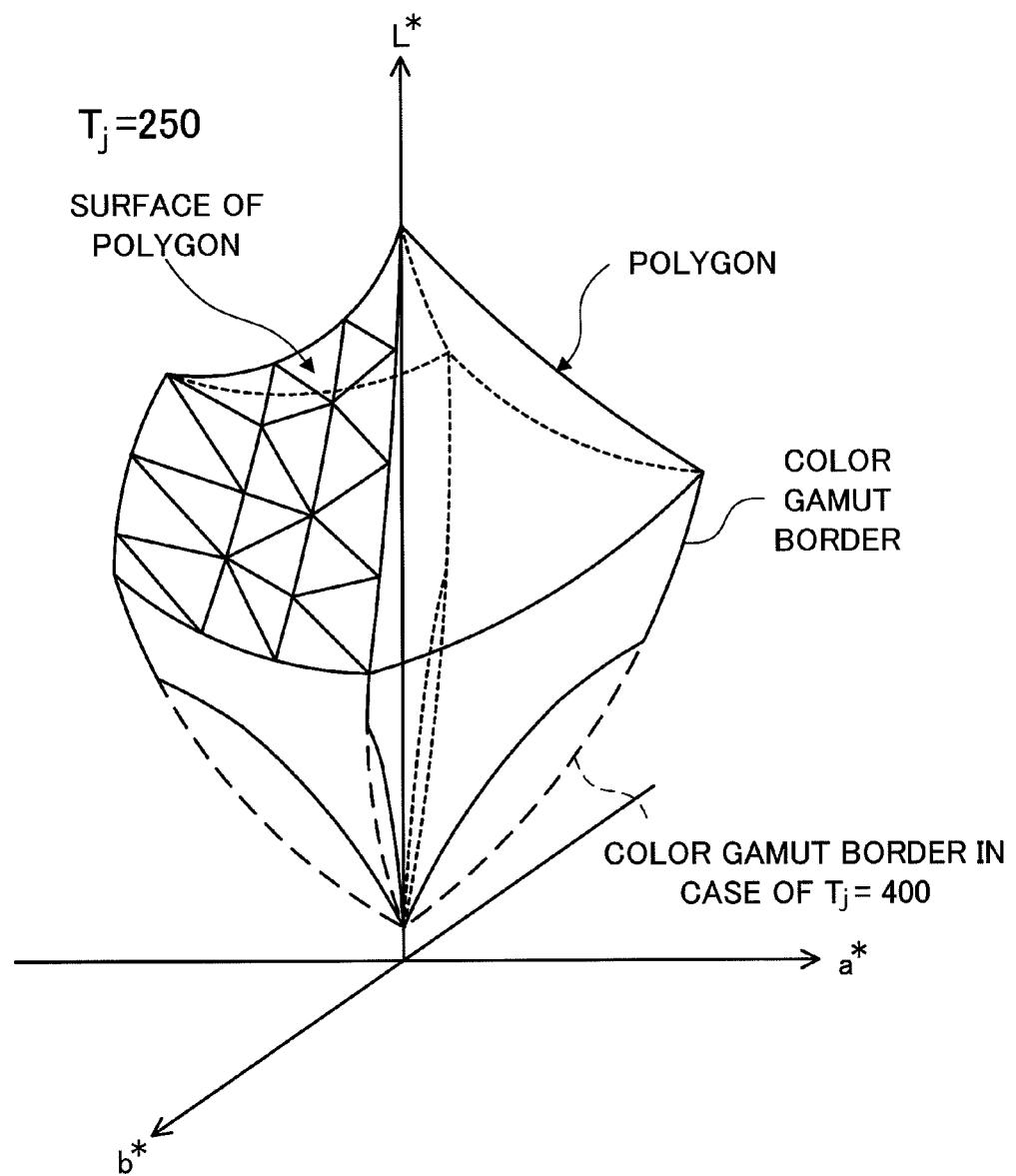
Figure 8:
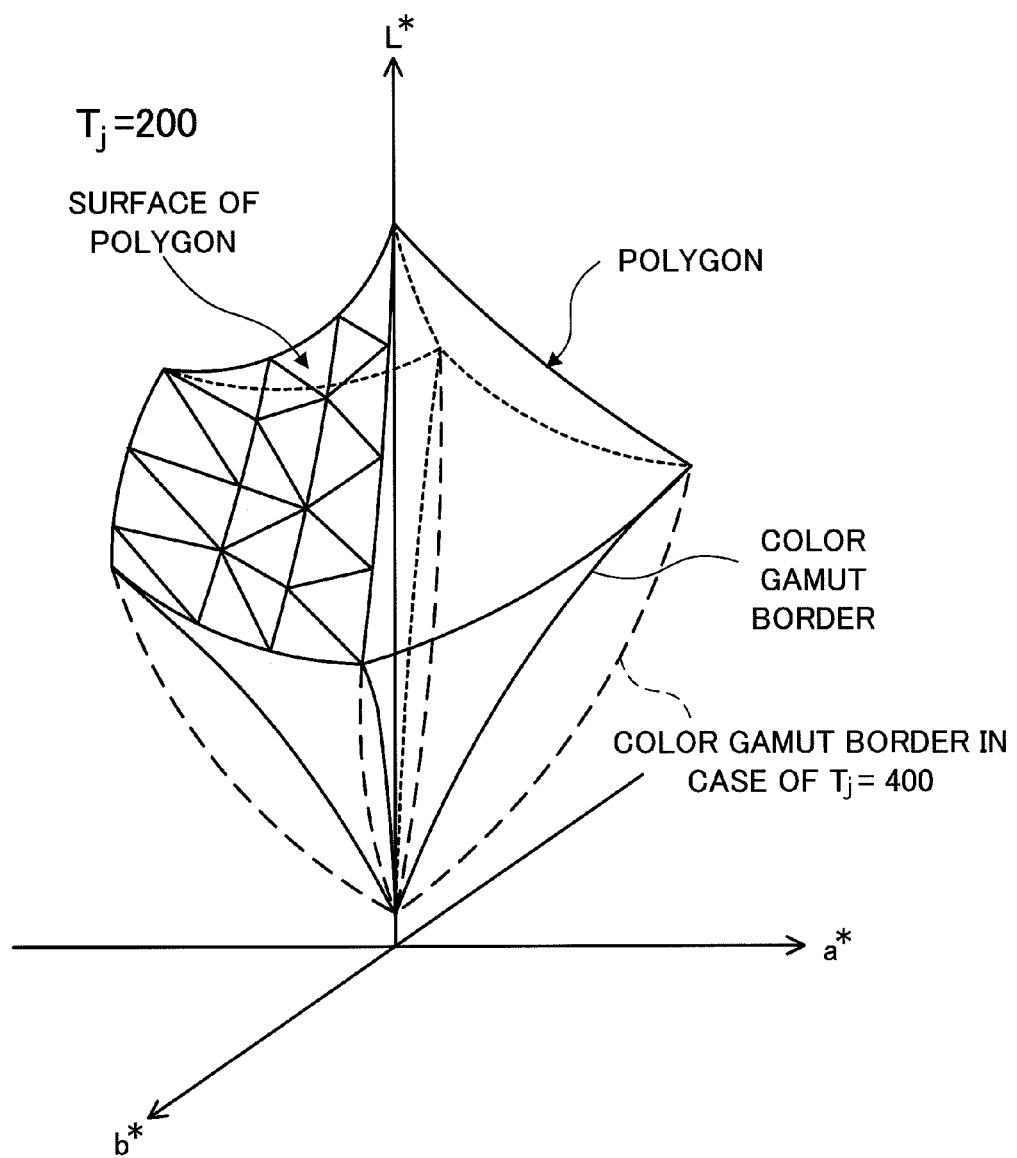

FIG. 6 shows a polygon in the case where $T_j=300$ is set. In the polygon shown in FIG. 6, as compared to the polygon shown in FIG. 5, the color reproduction range is set narrow in a lower part of the luminance L* in order to limit the total limit value $T_j$ to 300. Similarly, FIGS. 7 and 8 show polygons in the cases where $T_j=250$ and $T_j=200$ are set, respectively. As shown in FIGS. 5 to 8, the polygon setting part 14 sets the polygon configured such that, as the total limit value $T_j$ is smaller, the color reproduction range in a low part of the luminance L* is narrower.

In other words, the polygons set by the polygon setting part 14 as shown in FIGS. 5 to 8 are configured such that each of the color component total values of color signals after the color gamut compression processing should be equal to or smaller than the total limit value $T_j$, for the color gamut compression processing by the color gamut compressing part 15 described below. In essence, the inside of a polygon including its surfaces is configured by a group of color coordinates (a color coordinate group) whose color component total values of color signals are all equal to or smaller than the total limit value $T_j$.

FIGS. 5 to 8 show the polygons in the cases where $T_j=400$, 300, 250 and 200 are set, respectively. However, in the case where the total limit value calculating part 13 calculates the total limit value $T_j$ based on the table shown in FIG. 3, the polygon setting part 14 sets a polygon corresponding to any of different $T_j$ values within a range of $T_j=280$ to 50 inclusive.

The color gamut compressing part 15 is one example of a color gamut compressing part. From the L*a*b* signal converting part 12, the color gamut compressing part 15 acquires the color coordinate values $(L_j^*, a_j^*, b_j^*)$ in the L*a*b* color space concerning the grid points. In addition, from the polygon setting part 14, the color gamut compressing part 15 acquires the polygon configured according to the total limit value $T_j$ that is calculated by the total limit value calculating part 13 for the grid point acquired from the L*a*b* signal converting part 12. Thereafter, the color gamut compressing part 15 performs the color gamut compression processing (mapping processing) on the color coordinate values existing outside the polygon (outside the color gamut), among the color coordinate values of the grid points acquired from the L*a*b* signal converting part 12.

Figure 9:
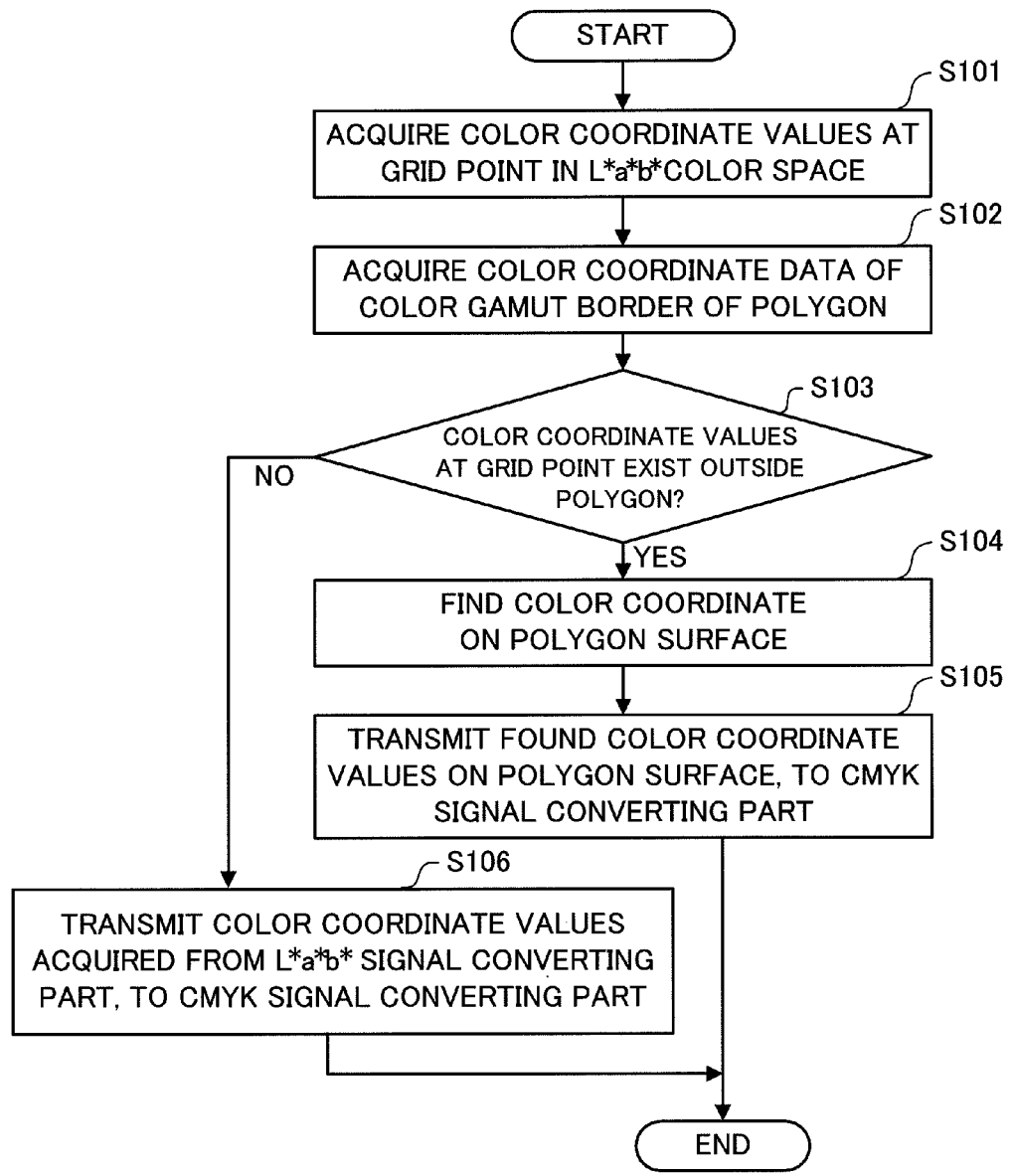
FIG. 9 is a flowchart for explaining one example of the mapping processing executed by the color gamut compressing part.

Here, the mapping processing executed by the color gamut compressing part 15 is described. FIG. 9 is a flowchart for explaining one example of the mapping processing executed by the color gamut compressing part 15. Here, the description is given by use of the L*a*b* color space as a device-independent color space, but color spaces other than the L*a*b* color space are also usable. Specifically, the other usable color spaces are device-independent color spaces related to color vision, such as the CIEXYZ color space, the CIECAM02 color space, and the LMS color space. Instead, a color space in conformity with CIE, ISO/JIS standards and the like such as the sRGB (sYCC) color space and Japan Color (Euro Color, SWOP), or a standardized color space such as Adobe RGB may be used even though they are nominally device-dependent color spaces.

As shown in the processing flow in FIG. 9, the color gamut compressing part 15 acquires the color coordinate values $(L_j^*, a_j^*, b_j^*)$ in the L*a*b* color space concerning each grid point, from the L*a*b* signal converting part 12 (S101). In addition, the color gamut compressing part 15 acquires color coordinate data (border information) of the color gamut border of the polygon transmitted from the polygon setting part 14 (S102). Then, the color gamut compressing part 15 determines whether or not the color coordinate values at the grid point acquired from the L*a*b* signal converting part 12 exist outside the polygon acquired from the polygon setting part 14 (S103).

If the color coordinate values at the grid point are determined as existing outside the polygon in step 103, the color gamut compressing part 15 finds a color coordinate point on the polygon surface by use of, for example, a color difference minimization method or the like (S104). Then, to the CMYK signal converting part 16, the color gamut compressing part 15 transmits the color coordinate values of the found color coordinate point on the polygon surface (S105).

Note that, in step 103, Perceptual, Saturation, Colorimetric or the like described in the International Color Consortium Format proposed by International Color Consortium may be used instead of the color difference minimization method. Perceptual is a method of finding color coordinate points on the polygon surface for not only colors outside the polygon (color gamut) but also colors inside the polygon by moving these colors at certain rates toward a certain fixed point on the gray (L*) axis inside the polygon while maintaining the hue. Saturation is a method of finding color coordinate points on the polygon surface only for colors outside the polygon by moving the colors toward a certain fixed point on the gray (L*) axis inside the polygon while maintaining the hue. Colorimetric is a method of finding color coordinate points on the polygon surface only for colors outside the polygon by moving the colors to the gray (L*) axis inside the polygon while maintaining the luminance and hue.

On the other hand, if the color coordinate values of the grid point are determined as existing inside the polygon in step 103, the color gamut compressing part 15 transmits the color coordinate values at the grid point acquired from the L*a*b* signal converting part 12, to the CMYK signal converting part 16, without performing the color gamut compression processing for the grid point In this way, the color gamut compressing part 15 performs the color gamut compression processing. The color gamut compressing part 15 of the first exemplary embodiment uses the polygon that is configured by the polygon setting part 14 to make the color component total values of color signals equal to or smaller than the total limit value $T_j$ after the color gamut compression processing. Accordingly, the color signals after the color gamut compression processing are set to have the color component total values equal to or smaller than the total limit value $T_j$.

Incidentally, the color gamut compressing part 15 may perform the color gamut compression processing using a table, instead of using the foregoing method. Specifically, a table composed of conversion coefficients (parameters) is stored in, for example, the nonvolatile memory 104 which is one example of a memory unit. The conversion coefficients are used to convert the color coordinate values at the grid points acquired from the L*a*b* signal converting part 12, into the color coordinate values of the color coordinate points on the polygon surface acquired from the polygon setting part 14. Then, the color gamut compressing part 15 performs the color gamut compression processing using the table to convert the color coordinate values at the grid points acquired from the L*a*b* signal converting part 12, into the color coordinate values on the polygon surface acquired from the polygon setting part 14.

In this case, the parameters constituting the table are calculated by the CPU 101 which is one example of a calculation unit. To be more precise, the parameters are calculated based on, for example, both the color coordinate values ($L_j^*$, $a_j^*$, $b_j^*$) in the L*a*b* color space for each grid point, and the color coordinate values of the color coordinate point on the polygon surface acquired from the polygon setting part 14 for each grid point and calculated by using, for example, the color difference minimization method or the like.

Incidentally, at this time, the color signal converting apparatus 1 functions as an image signal processing apparatus that calculates the parameters constituting the table.

The CMYK signal converting part 16 is one example of a second color space converting part. In accordance with predetermined color converting characteristics, the CMYK signal converting part 16 converts the color coordinate values ($L_j^*$, $a_j^*$, $b_j^*$) at each grid point transmitted from the color gamut compressing part 15, into the color coordinate values in the CMYK color space that is the device-dependent color space, that is, the output color signal ($C_j'$, $M_j'$, $Y_j'$, $K_j'$) (a second color signal).

The color converting characteristics used here are estimated as color converting characteristics uniquely owned by an image forming apparatus such as a printer or the like outputting an image based on a color signal conversion profile (described below) generated by the color conversion apparatus 1. More specifically, a color patch (color sample) including various combinations of color signals (C, M, Y, K) in the CMYK color space is printed by, for example, an image forming apparatus. Then, the color of the color patch is measured (color-measured) in the L*a*b* color space, for example. Thereafter, actual data pairs are generated. Specifically, each actual data pair is composed of the actual data of an input signal (C, M, Y, K), and that of the color coordinates (L*, a*, b*) of the color patch of an output image in the L*a*b* color space. Thereafter, the color converting characteristics are estimated by performing, for example, statistical processing such as the linear regression analysis using the generated actual data of the input signals (C, M, Y, K), and that of the color coordinates (L*, a*, b*) of the output images. Other applicable methods for estimating the color converting characteristics from the actual data pair include a method in which the color converting characteristics are estimated through interpolating processing by simply calculating the weight averages of the actual data pairs, a method in which the color converting characteristics are estimated through statistic processing using a neural network that has learned the actual data pairs, or the like.

Here, the CMYK signal converting part 16 performs processing of converting three-dimensional color coordinate values ($L_j^*$, $a_j^*$, $b_j^*$) transmitted from the color gamut compressing part 15, into a four-dimensional output color signal ($C_j'$, $M_j'$, $Y_j'$, $K_j'$). In this case, the solution is not determined uniquely due to a lack of known values. However, the output color signal ($C_j'$, $M_j'$, $Y_j'$, $K_j'$) converted by the CMYK signal converting part 16 are obtained by converting the color coordinate values of which the color component total value is set to be equal to or smaller than the total limit value $T_j$ by the color gamut compressing part 15. For this reason, the obtained solutions surely include at least one solution ($C_j'$, $M_j'$, $Y_j'$, $K_j'$) having the color component total value ($C_j'+M_j'+Y_j'+K_j'$) of the output color signal ($C_j'$, $M_j'$, $Y_j'$, $K_j'$) equal to or smaller than the total limit value $T_j$. Accordingly, if two or more solutions are obtained, the CMYK signal converting part 16 performs the processing of selecting one solution ($C_j'$, $M_j'$, $Y_j'$, $K_j'$) having the color component total value equal to or smaller than the total limit value $T_j$. Thus, the selected solution having the color component total value equal to or smaller than the total limit value $T_j$ is set as the output color signal ($C_j'$, $M_j'$, $Y_j'$, $K_j'$).

The CMYK signal outputting part 17 acquires the output color signal ($C_j'$, $M_j'$, $Y_j'$, $K_j'$) converted by the CMYK signal converting part 16. In addition, the CMYK signal outputting part 17 acquires the color coordinate values ($C_j$, $M_j$, $Y_j$, $K_j$) at the grid point from the CMYK signal receiving part 11, which is an original color signals converted into the output color signal by the CMYK signal converting part 16. Then, the CMYK signal outputting part 17 generates a color signal conversion profile in which the color coordinate values ($C_j$, $M_j$, $Y_j$, $K_j$) at each of grid points received by the CMYK signal receiving part 11 are associated with the corresponding output color signal ($C_j'$, $M_j'$, $Y_j'$, $K_j'$) converted by the CMYK signal converting part 16. Thereafter, the CMYK signal outputting part 17 outputs the generated color signal conversion profile into a memory unit of an image processing apparatus mounted in an image forming apparatus such as a printer or the like. The memory unit in the image processing apparatus stores the color signal conversion profile having a data pair of the color coordinate values ($C_j$, $M_j$, $Y_j$, $K_j$) of each of grid points received by the CMYK signal receiving part 11, and the corresponding output color signal ($C_j'$, $M_j'$, $Y_j'$, $K_j'$) converted by the CMYK signal converting part 16.

Figure 10:
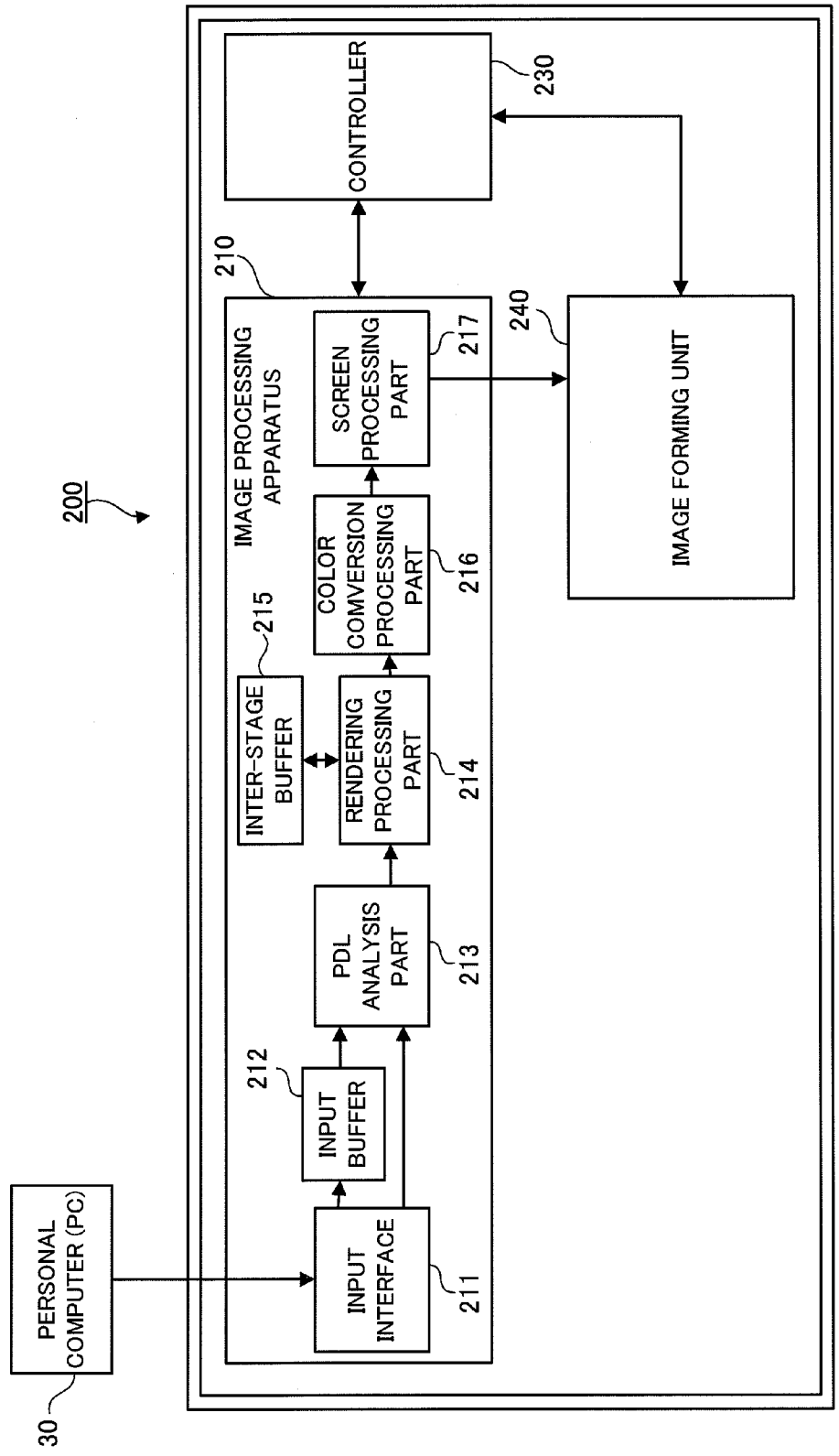
FIG. 10 is a block diagram showing a configuration of an image forming apparatus in which an image processing apparatus is mounted, the image processing apparatus storing the color signal conversion profile generated by the color signal converting apparatus of the first exemplary embodiment.

FIG. 10 is a block diagram showing a configuration of an image forming apparatus 200 in which an image processing apparatus is mounted, the image processing apparatus storing the color signal conversion profile generated by the color signal converting apparatus 1 of the first exemplary embodiment.

The image forming apparatus 200 shown in FIG. 10 is, for instance, a digital color printer, and includes an image processing apparatus 210, a controller 230 and an image forming unit 240. The image processing apparatus 210 executes predetermined image processing on image data inputted from an external apparatus. The controller 230 controls the whole operations of the image forming apparatus 200. The image forming unit 240 is made of, for example, an electrographic printer engine which forms images on a recording medium according to image data composed of each of color components.

The image processing apparatus 210 includes an input interface 211, an input buffer 212, a PDL (Page Description Language) analysis part 213, a rendering processing part 214, an inter-stage buffer 215, a color conversion processing part 216 and a screen processing part 217. The input interface 211 receives input of image data from an external apparatus such as a personal computer (PC) 30, for example. The input buffer 212 temporarily stores the image data received by the input interface 211. The PDL analysis part 213 analyzes image data in the PDL format, and thereby generates intermediate data. The rendering processing part 214 expands (renders) the intermediate data generated by the PDL analysis part 213 into image data for printing expressed in a sequence of pixel alignment (raster image data). The inter-stage buffer 215 is used as a work area for the rendering processing by the rendering processing part 214. The color conversion processing part 216 performs the color conversion processing of the image data thus rendered. The screen processing part 217 performs screen processing on the image data after the color conversion.

Then the color conversion processing part 216 of the image processing apparatus 210 stores the color signal conversion profile generated by the color signal converting apparatus 1 of the first exemplary embodiment. The color conversion processing part 216 performs the color conversion processing on the image data rendered by the rendering processing part 214, according to the stored color signal conversion profile. After the screen processing part 217 performs the predetermined screen processing on the image data after the color conversion processing by the color conversion processing part 216, an image based on the resultant image data is formed on a sheet by the image forming unit 240.

As described above, the color signal converting apparatus 1 of the first exemplary embodiment sets the total limit value $T_j$ for each pixel. Thereafter, when performing the color gamut compression processing, the color gamut compressing part 15 uses the polygon in which the color component total value of the color signal becomes equal to or smaller than the predetermined total limit value $T_j$ after the color gamut compression processing. Thereby, the color gamut compressing part 15 finds the color coordinate point on the polygon surface with the color component total value limited to a range up to the total limit value $T_j$ inclusive. As described above, the total limit value $T_j$ is set based on the color component total value of a color signal for each pixel. Accordingly, use of the total limit value $T_j$ thus set suppresses a decrease of accuracy in color reproduction while the color material total amount for the output color signal is limited.

[Second Exemplary Embodiment]

In the first exemplary embodiment, the color signal converting apparatus 1 has been described for the configuration of obtaining the output color signal ($C_j'$, $M_j'$, $Y_j'$, $K_j'$) by presetting the total limit value $T_j$ for each pixel, and thus by using the polygon within a range up to the preset total limit value $T_j$ inclusive. In the second exemplary embodiment, description will be provided for a color signal converting apparatus 2 configured to determine whether or not the output color signal ($C_j'$, $M_j'$, $Y_j'$, $K_j'$) equal to or smaller than a predetermined total limit value $T_j$ exists, and then to perform the color gamut compression processing if no output color signal equal to or smaller than the total limit value $T_j$ exists. Incidentally, the same components as those of the first exemplary embodiment will be described with the same reference numerals, and the detailed description is omitted here.

Figure 11:
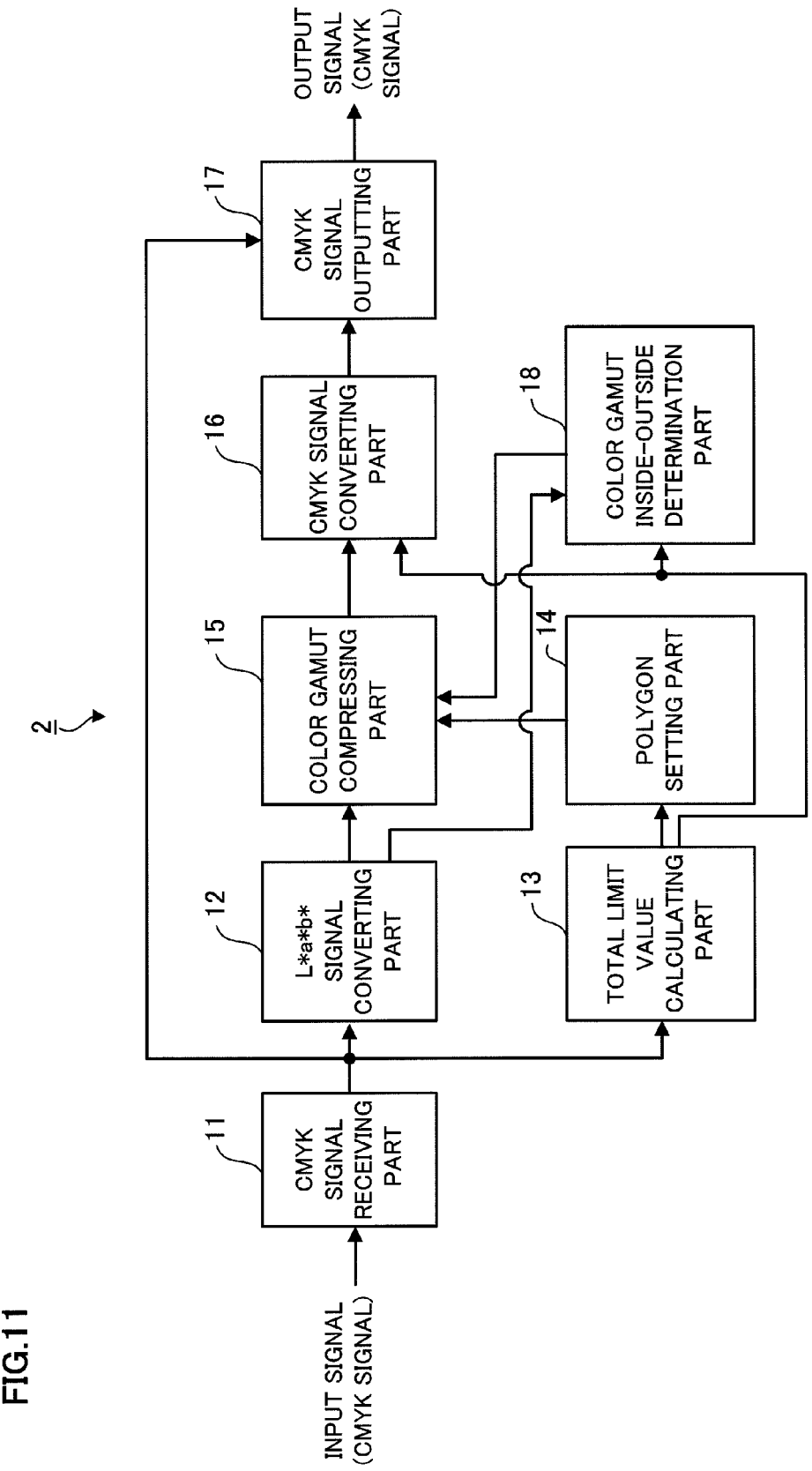
FIG. 11 is a block diagram for explaining a configuration of the color signal converting apparatus of the second exemplary embodiment.

FIG. 11 is a block diagram for explaining a configuration of the color signal converting apparatus 2 of the second exemplary embodiment. The color signal converting apparatus 2 shown in FIG. 11 includes a color gamut inside-outside determination part 18 in addition to the configuration of the color signal converting apparatus 1 of the first exemplary embodiment. With respect to each of grid points inputted from the L*a*b* signal converting part 12 to the color gamut compressing part 15, the color gamut inside-outside determination part 18 determines whether the color coordinate values ($L_j^*$, $a_j^*$, $b_j^*$) at the grid point in the L*a*b* color space exist inside or outside the polygon set by the polygon setting part 14.

In addition, as similar to the CMYK signal converting part 16 of the first exemplary embodiment, a CMYK signal converting part 16 of the second exemplary embodiment converts the color coordinate values ($L_j^*$, $a_j^*$, $b_j^*$) at each of grid points transmitted from the color gamut compressing part 15, into the output color signal ($C_j'$, $M_j'$, $Y_j'$, $K_j'$) in the CMYK color space, which is a device-dependent color space. Although this conversion is also performed in accordance with predetermined color converting characteristics, the color converting characteristics used in the CMYK signal converting part 16 of the second exemplary embodiment are ones for converting the color coordinate values into the output color signal ($C_j'$, $M_j'$, $Y_j'$, $K_j'$) whose color component total value $C_j'+M_j'+Y_j'+K_j'$ is a predetermined value $Q_j$.

Similarly to the case with the first exemplary embodiment, the color converting characteristics used in the CMYK signal converting part 16 are estimated by performing, for example, a linear regression analysis which is statistic processing, using two sets of actual data. One of the two sets of actual data is actual data of input signals (C, M, Y, K) in an image forming apparatus such as a printer, and the other one is actual data of the color coordinates (L*, a*, b*) of the color patch of an output image in the L*a*b* color space. When the color converting characteristics indicating correspondences from the color coordinates (L*, a*, b*) to the output color signals (C', M', Y', K') are estimated, the values of four-dimensional output color signal (C', M', Y', K') are estimated based on the values of three-dimensional color coordinates (L*, a*, b*). In this case, however, due to a lack of the known values, the output color signal (C', M', Y', K') is not determined uniquely. For this reason, the CMYK signal converting part 16 of the second exemplary embodiment is configured to find the output color signal (C', M', Y', K') under the condition that the total value of C'+M'+Y'+K' takes the predetermined value Q. With this configuration, the output color signal (C', M', Y', K') is determined uniquely. In this way, generated are the color converting characteristics in which the color coordinates (L*, a*, b*) are associated with the output color signal (C', M', Y', K') having the total value of C'+M'+Y'+K' taking the predetermined value Q.

More specifically, in the CMYK signal converting part 16, the color converting characteristics are set to convert a combination of the color coordinate values $(L_j^*, a_j^*, b_j^*)$ at the grid point, and the predetermined value $Q_j$ $(L_j^*, a_j^*, b_j^*, Q_j)$, into the output color signal $(C_j', M_j', Y_j', K_j')$ whose total value of $C_j'+M_j'+Y_j'+K_j'$ is equal to the predetermined value $Q_j$. In accordance with the set color converting characteristics, the color coordinate values $(L_j^*, a_j^*, b_j^*)$ at the grid point are converted into the output color signal $(C_j', M_j', Y_j', K_j')$ whose total value of $C_j'+M_j'+Y_j'+K_j'$ is equal to the predetermined value $Q_j$.

Next, the color gamut inside-outside determination part 18 will be described. The color gamut inside-outside determination part 18 includes a minimum value estimation model for estimating a minimum value $P_j$ of the color component total value $(C_j'+M_j'+Y_j'+K_j')$ of the output color signal $(C_j', M_j', Y_j', K_j')$ converted by the CMYK signal converting part 16.

As described above, when the four-dimensional output color signal (C', M', Y', K') is estimated based on the three-dimensional color coordinates (L*, a*, b*), some output color signals (C', M', Y', K') are obtained through the estimation from the color coordinates (L*, a*, b*), due to a lack of the known values. In accordance with the minimum value estimation model, among the several output color signals (C', M', Y', K') estimated from the color coordinates (L*, a*, b*), one output color signal that takes the minimum color component total value $(C_j'+M_j'+Y_j'+K_j')$ is selected, and then is associated with the minimum value $P_j$.

By use of this minimum value estimation model, the color gamut inside-outside determination part 18 calculates the minimum value $P_j$ of the color component total value $(C_j'+M_j'+Y_j'+K_j')$ of the output color signal $(C_j', M_j', Y_j', K_j')$ converted by the CMYK signal converting part 16 based on the color coordinate values $(L_j^*, a_j^*, b_j^*)$ at each of grid points acquired from the L*a*b* signal converting part 12.

The minimum value $P_j$ indicates the minimum necessary color component total amount value (the amount of color materials such as toner) for reproducing an image represented by color signals inputted to an image forming apparatus such as a printer, for example.

After that, by use of the minimum value $P_j$ calculated in accordance with the minimum value estimation model, the color gamut inside-outside determination part 18 determines, for each of the color coordinate values $(L_j^*, a_j^*, b_j^*)$ at the grid points inputted from the L*a*b* signal converting part 12 to the color gamut compressing part 15, whether the color coordinate values $(L_j^*, a_j^*, b_j^*)$ in the L*a*b* color space at the grid point exist inside or outside the polygon set by the polygon setting part 14.

Figure 12:
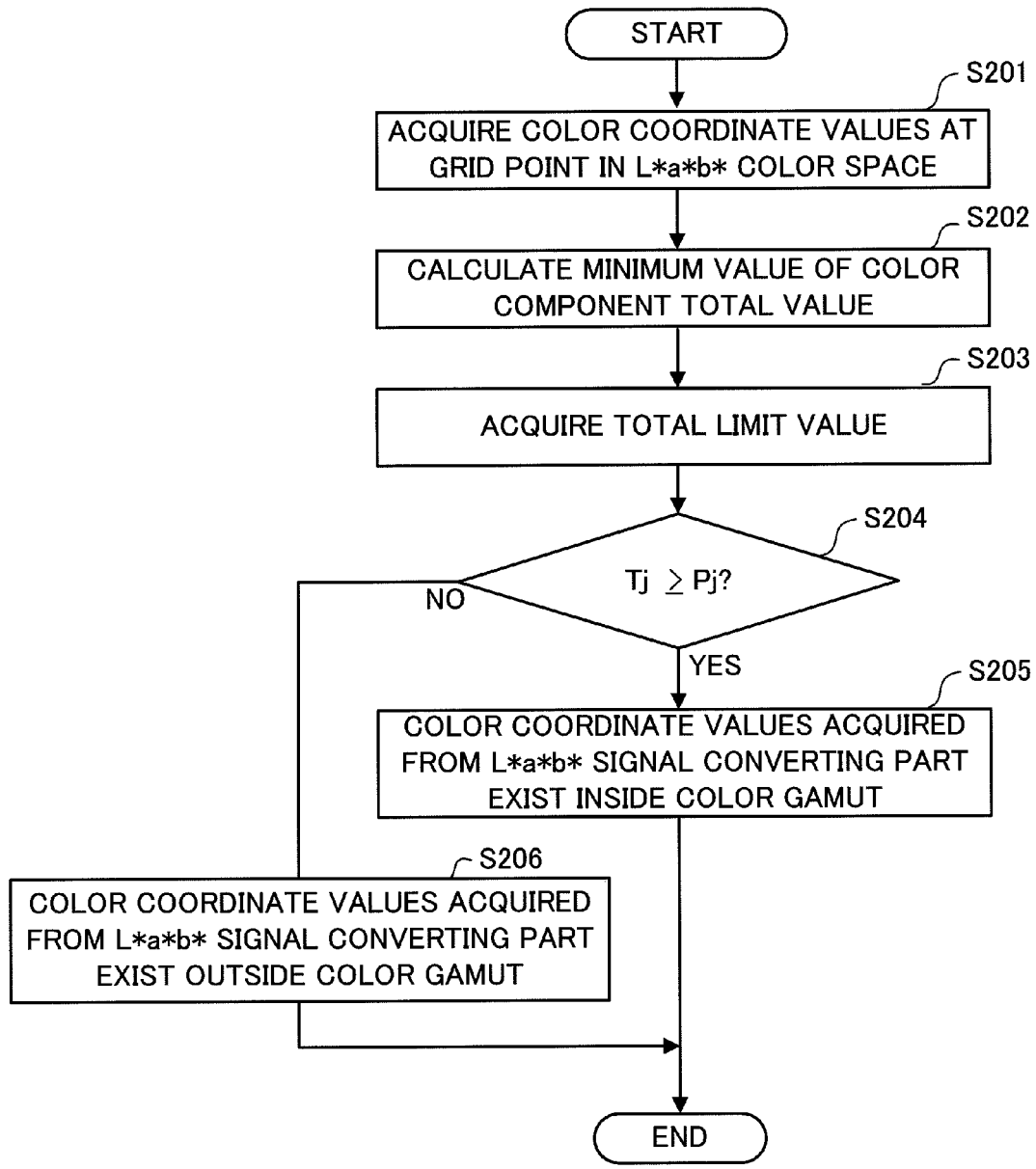
FIG. 12 is a flowchart showing one example of the procedure of the determination processing executed by the color gamut inside-outside determination part.

Here, description will be given for determination processing executed by the color gamut inside-outside determination part 18. FIG. 12 is a flowchart showing one example of the procedure of the determination processing executed by the color gamut inside-outside determination part 18. As shown in FIG. 12, the color gamut inside-outside determination part 18 acquires the color coordinate values $(L_j^*, a_j^*, b_j^*)$ at the grid points from the L*a*b* signal converting part 12 (S201).

After that, by use of the foregoing minimum value estimation model, the color gamut inside-outside determination part 18 calculates the minimum value $P_j$ of the color component total value $(C_j'+M_j'+Y_j'+K_j')$ of the output color signal $(C_j', M_j', Y_j', K_j')$ converted by the CMYK signal converting part 16, with respect to the color coordinate values $(L_j^*, a_j^*, b_j^*)$ acquired in step 201 (S202).

Then, from the total limit value calculating part 13, the color gamut inside-outside determination part 18 acquires the total limit value $T_j$ at the grid point acquired in step 201 (S203).

Thereafter, the color gamut inside-outside determination part 18 compares the minimum value $P_j$ calculated in step 202 with the total limit value $T_j$ acquired in step 203 (S204).

If the total limit value $T_j \geq$ the minimum value $P_j$ is determined as true in step 204, the color coordinate values $(L_j^*, a_j^*, b_j^*)$ at the grid point inputted from the L*a*b* signal converting part 12 to the color gamut compressing part 15 are reproducible without exceeding the total limit value $T_j$. Accordingly, the color coordinate values $(L_j^*, a_j^*, b_j^*)$ is determined as existing inside the polygon set according to the total limit value $T_j$ by the polygon setting part 14 (S205).

On the other hand, if the total limit value $T_j <$ the minimum value $P_j$ is determined as true in step 204, the color coordinate values $(L_j^*, a_j^*, b_j^*)$ inputted to the color gamut compressing part 15 requires a color component total value larger than the total limit value $T_j$ for reproduction. Thus, the color coordinate values $(L_j^*, a_j^*, b_j^*)$ is determined as existing outside the polygon set according to the total limit value $T_j$ by the polygon setting part 14 (S206).

As described above, the color gamut inside-outside determination part 18 determines whether each grid point (pixel) exists inside or outside the polygon, by comparing the total limit value $T_j$ and the minimum value $P_j$. This determination allows the color gamut compressing part 15 to determine, within a shorter time, whether the color gamut compression processing needs to be executed. Thus, the color signal conversion processing in the color signal converting apparatus 2 of the second exemplary embodiment is speeded up.

Hereinafter, description will be given for color gamut compression processing executed by the color gamut compressing part 15 in step 206 of the processing flow shown in FIG. 12, if the color coordinate values $(L_j^*, a_j^*, b_j^*)$ inputted to the color gamut compressing part 15 are determined as existing outside the polygon set according to the total limit value $T_j$.

If the color coordinate values $(L_j^*, a_j^*, b_j^*)$ inputted to the color gamut compressing part 15 exist outside the polygon set by the polygon setting part 14, the color gamut compressing part 15 finds out color coordinate values $(L_j^{*\prime}, a_j^{*\prime}, b_j^{*\prime})$ in accordance with the processing procedure shown in the following FIG. 13, for example. Here, the found color values $(L_j^{*\prime}, a_j^{*\prime}, b_j^{*\prime})$ are reproducible without exceeding the total limit value $T_j$, and approximates the color coordinate values $(L_j^*, a_j^*, b_j^*)$.

Figure 13:
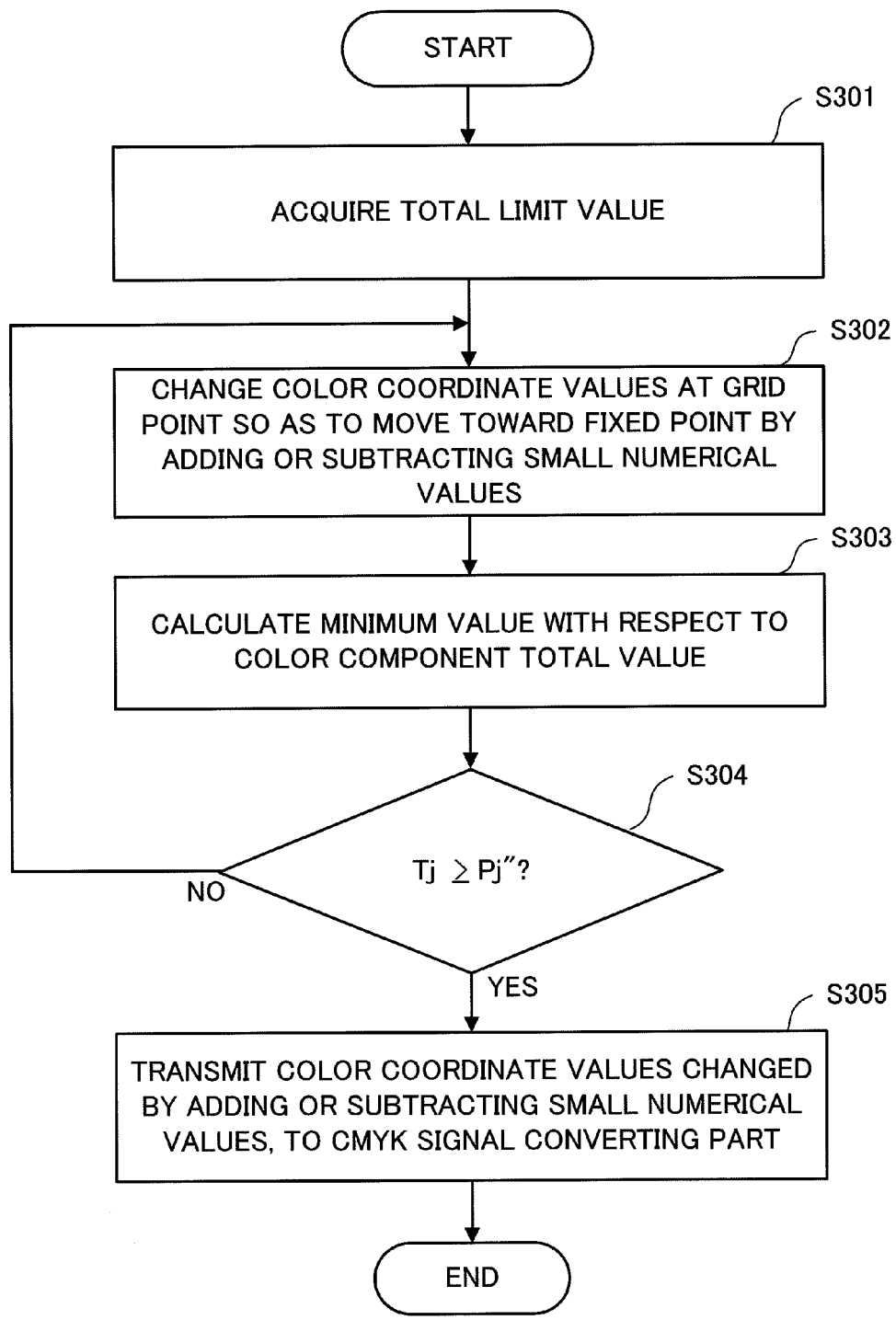
FIG. 13 is a flowchart showing one example of the procedure of the color gamut compression processing executed by the color gamut compressing part.

FIG. 13 is a flowchart showing one example of the procedure of the color gamut compression processing executed by the color gamut compressing part 15.

As shown in FIG. 13, the color gamut compressing part 15 firstly acquires the total limit value $T_j$ at a particular grid point from the total limit value calculating part 13 (S301). Next, by adding or subtracting small numerical values to or from the respective color coordinate values ($L_j^*$, $a_j^*$, $b_j^*$) of the grid point, the color gamut compressing part 15 changes the color coordinate values ($L_j^*$, $a_j^*$, $b_j^*$) so as to move toward a fixed point inside the polygon set according to the total limit value $T_j$, for example, a fixed point on the L* axis (S302). More specifically, assuming that BA denotes a line segment connecting a coordinate point B of the grid point having the color coordinate values ($L_j^*$, $a_j^*$, $b_j^*$) to a fixed point A on the L* axis in the L*a*b* color space, the color gamut compressing part 15 changes the length of the line segment BA by an appropriate number of unit lengths.

Figure 14:
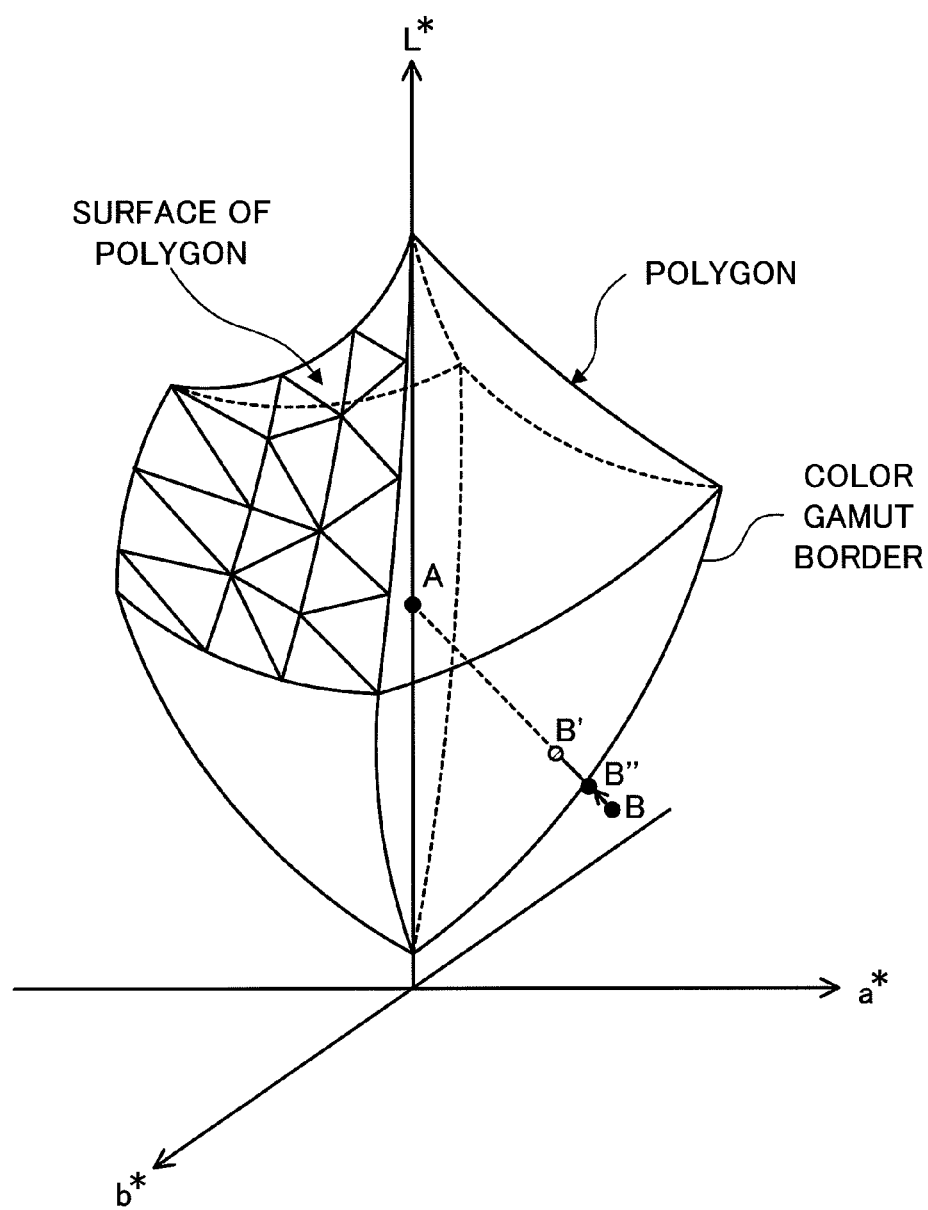
FIG. 14 is a diagram for explaining a state where the length of the line segment BA connecting the coordinate point B of the grid point and the fixed point A on the L* axis is changed.

FIG. 14 is a diagram for explaining a state where the length of the line segment BA connecting the coordinate point B of the grid point and the fixed point A on the L* axis is changed. As shown in FIG. 14, the color coordinate values ($L_j^*$, $a_j^*$, $b_j^*$) of the coordinate point B are changed through the addition and subtraction of small numerical values so as to move toward the fixed point A, whereby the coordinate point B is moved to the coordinate point B"($L_j^*+\Delta L_j^*$, $a_j^*+\Delta a_j^*$, $b_j^*+\Delta b_j^*$) Note that the values $\Delta L_j^*$, $\Delta a_j^*$ and $\Delta b_j^*$ are much smaller than the respective values $L_j^*$, $a_j^*$ and $b_j^*$. Moreover, in FIG. 14, a coordinate point B' is an intersection of the line segment BA and the color gamut border of the polygon.

Thereafter, by use of the same minimum value estimation model as that set in the color gamut inside-outside determination part 18, the color gamut compressing part 15 calculates a minimum value $P_j''$ with respect to the color component total value of the coordinate point B" ($L_j^*+\Delta L_j^*$, $a_j^*+\Delta a_j^*$, $b_j^*+\Delta b_j^*$) (S303).

The color gamut compressing part 15 compares the minimum value $P_j''$ calculated in step 303 and the total limit value $T_j$ acquired in step 301 (S304).

If the total limit value $T_j$ >the minimum value $P_j''$ is determined as true in step 304, the coordinate point B" exists on the coordinate point B' or at an inner position from the coordinate point B' inside the polygon. As a result, the color gamut compressing part 15 transmits the current coordinate point B" ($L_j^*+\Delta L_j^*$, $a_j^*+\Delta a_j^*$, $b_j^*+\Delta b_j^*$) to the CMYK signal converting part 16, as the color coordinate values ($L_j^{*\prime}$, $a_j^{*\prime}$, $b_j^{*\prime}$) after the color gamut compression processing (S305).

On the other hand, if the total limit value $T_j$<the minimum value $P_j''$ is determined as true in step 304, the processing goes back to step 302 and the color coordinate values ($L_j^*$, $a_j^*$, $b_j^*$) are again changed through the addition and subtraction of small numerical values. Thus, the color gamut compressing part 15 eventually finds the coordinate point B" that satisfies the total limit value $T_j \geq$ the minimum value $P_j$.

Incidentally, instead of the method of finding the coordinate point B" that satisfies the total limit value $T_j$ >the minimum value $P_j''$, another method such as the steepest descent method or the methods described in the first exemplary embodiment may be used.

Hereinafter, description will be provided for conversion processing in which the CMYK signal converting part 16 converts the color coordinate values ($L_j^*$, $a_j^*$, $b_j^*$) at the grid point, into the output color signal ($C_j'$, $M_j'$, $Y_j'$, $K_j'$).

As described above, the color gamut inside-outside determination part 18 determines whether the total limit value $T_j$>the minimum value $P_j$ is true (in step 204 of FIG. 12). Then, if the color coordinate values ($L_j^*$, $a_j^*$, $b_j^*$) at the grid point inputted from the L*a*b* signal converting part 12 to the color gamut compressing part 15 are determined as existing inside the polygon set according to the total limit value $T_j$ (in step 205 of FIG. 12), the color gamut compressing part 15 transmits the color coordinate values at the grid point acquired from the L*a*b* signal converting part 12, to the CMYK signal converting part 16, without performing the color gamut compression processing for the grid point.

In this case, the CMYK signal converting part 16 sets, as the minimum value $P_j$, the predetermined value $Q_j$ in the color converting characteristics set in the CMYK signal converting part 16. Then, in accordance with the set color converting characteristics, the CMYK signal converting part 16 converts the color coordinate values ($L_j^*$, $a_j^*$, $b_j^*$) at the grid point, into the output color signal ($C_j'$, $M_j'$, $Y_j'$, $K_j'$) whose color component total value ($C_j'+M_j'+Y_j'+K_j'$) is the minimum value $P_j$.

In addition, if the total limit value $T_j$<minimum value $P_j$ is determined (in step 204 of FIG. 12), and also if the color coordinate values ($L_j^*$, $a_j^*$, $b_j^*$) inputted to the color gamut compressing part 15 is determined to exist outside the polygon set according to the total limit value $T_j$ (in step 206 of FIG. 12), the color gamut compressing part 15 finds the coordinate point B" that satisfies the total limit value $T_j$>the minimum value $P_j$, in accordance with the processing flow shown in FIG. 13, for example. Then, the CMYK signal converting part 16 receives the color coordinate values ($L_j^{*\prime}$, $a_j^{*\prime}$, $b_j^{*\prime}$) after the color gamut compression processing.

In this case, the CMYK signal converting part 16 sets, as the total limit value $T_j$, the predetermined value $Q_j$ of the color converting characteristics set in the CMYK signal converting part 16. Then, in accordance with the set color converting characteristics, the CMYK signal converting part 16 converts the color coordinate values ($L_j^*$, $a_j^*$, $b_j^*$) at the grid point, into the output color signal ($C_j'$, $M_j'$, $Y_j'$, $K_j'$) whose color component total value ($C_j'+M_j'+Y_j'+K_j'$) is equal to the total limit value $T_j$.

The foregoing conversion by the CMYK signal converting part 16 prevents the generation of an output color signal ($C_j'$, $M_j'$, $Y_j'$, $K_j'$) whose color component total value ($C_j'+M_j'+Y_j'+K_j'$) is greater than the total limit value $T_j$.

As described above, by comparing the total limit value $T_j$ and the minimum value $P_j$, the color signal converting apparatus 2 of the second exemplary embodiment determines whether the color coordinate values ($L_j^*$, $a_j^*$, $b_j^*$) inputted to the color gamut compressing part 15 exist inside or outside the polygon set according to the total limit value $T_j$ by the polygon setting part 14. This determination allows the color gamut compressing part 15 to determine, within a shorter time, whether or not the color gamut compression processing needs to be executed, whereby the color signal conversion processing is speeded up.

[Third Exemplary Embodiment]

In the second exemplary embodiment, the description has been provided for the color signal converting apparatus 2 configured to set the total limit value $T_j$ for each set of the color coordinate values (C, M, Y, K). In the third exemplary embodiment, description will be given for a color signal converting apparatus 2 configured to divide the color components of color coordinate values (C, M, Y, K) into plural groups, and to set a total limit value $T_j$ for each of the plural divided groups. Incidentally, the same components as those in the first exemplary embodiment will be described by use of the same reference numerals and the detailed description thereof is omitted here.

The color signal converting apparatus 2 of the third exemplary embodiment includes the same configuration as that of the color signal converting apparatus 2 in the second exemplary embodiment shown in FIG. 11. The total limit value calculating part 13 of the third exemplary embodiment shown in FIG. 11 divides the color components ($C_j$, $M_j$, $Y_j$, $K_j$) at each of grid points, into ($C_j$, $M_j$, $Y_j$) and ($K_j$). Then, the total limit value calculating part 13 determines a total limit value T1$_j$ corresponding to a color component total value H1$_j$ of (C$_j$, M$_j$, Y$_j$) at each of the grid points (pixels), along with a total limit value T2$_j$ corresponding to the value (K$_j$).

In this case, a table defining correspondences between the color component total value H1$_j$ of (C$_j$, M$_j$, Y$_j$) and the total limit value T1$_j$ is set in advance, and the total limit value T1$_j$ is figured out according to the table. Moreover, a table defining correspondences between the value (K$_j$) and the total limit value T2$_j$ is also set in advance, and the total limit value T2$_j$ is figured out according to the table.

Moreover, the color gamut inside-outside determination part 18 of the third exemplary embodiment shown in FIG. 11 includes two minimum value estimation models. One of the models is for estimating a minimum value P1$_j$ of the color component total value (C$_j$'+M$_j$'+Y$_j$') of the output color signal (C$_j$', M$_j$', Y$_j$', K$_j$') converted by the CMYK signal converting part 16, and the other model is for estimating a minimum value P2$_j$ of the component value K$_j$' alone. By use of these minimum value estimation models, the color gamut inside-outside determination part 18 calculates the minimum value P1$_j$ of the color component total value (C$_j$'+M$_j$'+Y$_j$') and the minimum value P2$_j$ of the component value K$_j$', with respect to the output color signal (C$_j$', M$_j$', Y$_j$', K$_j$') converted by the CMYK signal converting part 16 from the color coordinate values (L$_j$*, a$_j$*, b$_j$*) at the grid point acquired from the L*a*b* signal converting part 12.

Then, if the total limit value T1$_j$>the minimum value P1$_j$ and the total limit value T2$_j$>the minimum value P2$_j$ are determined as true in step 204 in the processing flow in FIG. 12, the color coordinate values (L$_j$*, a$_j$*, b$_j$*) at the grid point inputted from the L*a*b* signal converting part 12 to the color gamut compressing part 15 are determined as existing inside the polygon set according to the total limit value T$_j$ by the polygon setting part 14 (in step 205 in FIG. 12).

On the other hand, if at least one of the total limit value T1$_j$<the minimum value P1$_j$ and the total limit value T2$_j$<the minimum value P2$_j$ is determined as true in step 204 in the processing flow in FIG. 12, the color coordinate values (L$_j$*, a$_j$*, b$_j$*) inputted to the color gamut compressing part 15 are determined as existing outside the polygon set according to the total limit value T$_j$ by the polygon setting part 14 (in step 206 in FIG. 12).

Moreover, if the color gamut compressing part 15 of the third exemplary embodiment shown in FIG. 11 determines as true the total limit value T1$_j$>the minimum value P1$_j$" and the total limit value T2$_j$>the minimum value P2$_j$" in step 304 in the processing flow in FIG. 13, the coordinate point B" exists on the coordinate point B' or at an inner position from the coordinate point B' inside the polygon. Thus, the color gamut compressing part 15 transmits the current coordinate point B" (L$_j$*+ΔL$_j$*, a$_j$*+Δa$_j$*, b$_j$*+Δb$_j$*) to the CMYK signal converting part 16 (in step 305 of FIG. 11), as the color coordinate values (L$_j$*', a$_j$*', b$_j$*') after the color gamut compression processing.

Incidentally, the minimum value P1$_j$" and the minimum value P2$_j$" are calculated in accordance with the respective minimum value estimation models.

On the other hand, if any one of the total limit value T1$_j$<the minimum value P1$_j$" and the total limit value T2$_j$<the minimum value P2$_j$" is determined as true in step 304 in the processing flow of FIG. 11, the processing goes back to step 302 in FIG. 11. Then, the color coordinate values (L$_j$*, a$_j$*, b$_j$*) are again changed through the addition and subtraction of small numerical values. Thus, the color gamut compressing part 15 eventually finds the coordinate point B" that satisfies the total limit value T$_j$>the minimum value P$_j$.

As described above, in the color signal converting apparatus 2 of the third exemplary embodiment, the total limit value T1$_j$ for the color component total value H1$_j$ of (C$_j$, M$_j$, Y$_j$) and the total limit value T2$_j$ for the value (K$_j$) are independently set for each of grid points (pixels). With this setting, more accurate total limit values T$_j$ are set for the color coordinate values (C$_j$, M$_j$, Y$_j$, K$_j$) at each of grid points received by the CMYK signal receiving part 11.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A color signal converting apparatus comprising:
    a color signal receiving unit that receives input of first color signals; and
    a converting unit that performs a conversion of the first color signals received by the color signal receiving unit, into second color signals, the converting unit performing the conversion to make a total sum of color component values of each of the second color signals equal to or smaller than an upper limit value set for each of the second color signals,
    wherein the converting unit comprises:
    a first color space converting part that converts the first color signals in a first color space, into color signals in a second color space;
    a total sum upper limit setting part that sets the upper limit value for the total sum of the color component values of each of the second color signals for which the conversion is performed;
    a color gamut compressing part that performs color gamut compression processing to move the color signals in the second color space converted by the first color space converting part, to inside of a color region composed of a group of color coordinates that allows the total sum of the color component values in the first color space after the conversion by the converting unit to be equal to or smaller than the upper limit value set by the total sum upper limit setting part; and
    a second color space converting part that converts the color signals for which the color gamut compression processing is performed by the color gamut compressing part, into the second color signals in the first color space, and
    wherein the converting unit calculates the total sum of color component values of a color signal that has the smallest total sum of the color component values among color signals in the first color space after the conversion, when the color signals in the second color space converted by the first color space converting part are converted into the second color signals in the first color space, and
    the converting unit performs the color gamut compression processing by use of the color gamut compressing part, when the smallest total sum is greater than the upper limit value set by the total sum upper limit setting part.

2. The color signal converting apparatus according to claim 1, wherein the total sum upper limit setting part sets the upper limit value according to each of the total sums of the color component values of the first color signals.

3. The color signal converting apparatus according to claim 1, wherein the converting unit comprises:
- a first color space converting part that converts the first color signals in a first color space, into color signals in a second color space;
- a memory that stores a conversion coefficient used to convert each of the color signals in the second color space converted by the first color space converting part, into a color signal that exists on a surface of a color region or inside the color region, the color region composed of a group of color coordinates that allow the total sum of the color component values of each of the second color signals for which the conversion is performed, to be equal to or smaller than an upper limit value set in advance;
- a color gamut compressing part that performs color gamut compression processing to move each of the color signals in the second color space, to a color signal that exists on the surface of the color region or inside the color region, by use of the conversion coefficient stored in the memory; and
- a second color space converting part that converts the color signals for which the color gamut compression processing is performed by the color gamut compressing part, into the second color signals in the first color space.

4. A non-transitory computer readable medium storing a program causing a computer to execute a process for color conversion, the process comprising:
- receiving input of first color signals;
- setting an upper limit value for a total sum of color component values of each of second color signals in order to convert the received first color signals into the second color signals; and
- converting of the received first color signals into the second color signals having the color component values whose total sum is equal to or smaller than the upper limit value, wherein the process of converting the first color signals into the second color signals further comprises:
- converting the first color signals in a first color space, into color signals in a second color space;
- performing color gamut compression processing to move the color signals in the second color space obtained through the conversion, to a surface of a color region or inside of the color region, the color region composed of a group of color coordinates that allow the total sum of the color components values to be equal to or smaller than the upper limit value; and
- converting the color signals processed through the color gamut compression processing, into the second color signals in the first color space, and
wherein the process of converting the first color signals into the second color signals further comprises:
- calculating the total sum of the color component values of a color signal that has the smallest total sum of the color component values among color signals in the first color space after the conversion, when the color signals in the second color space are converted into the second color signals in the first color space; and
- performing the color gamut compression processing, when the smallest total sum is greater than the set upper limit value.

5. The non-transitory computer readable medium according to claim 4, wherein the process of setting the upper limit value sets the upper limit value according to the total sum of the color component values of each of the first color signals.

6. The non-transitory computer readable medium according to claim 4, wherein the first color signals comprise a first color component and a plurality of second color components, and the upper limit value is determined based on independent consideration of a color component value of the first color component and a sum of color component values of the plurality of second color components.

* * * * *